United States Patent
Kim et al.

(10) Patent No.: US 11,815,632 B2
(45) Date of Patent: Nov. 14, 2023

(54) PHOTOSENSOR

(71) Applicant: Kyungpook National University Industry-Academic Cooperation Foundation, Daegu (KR)

(72) Inventors: Hong Joo Kim, Daegu (KR); Jik Lee, Seoul (KR)

(73) Assignee: Kyungpook National University Industry-Academic Cooperation Foundation, Daegu (KR)

( * ) Notice: Subject to any disclaimer, the term of this patent is extended or adjusted under 35 U.S.C. 154(b) by 0 days.

(21) Appl. No.: 17/667,717

(22) Filed: Feb. 9, 2022

(65) Prior Publication Data

US 2022/0260730 A1    Aug. 18, 2022

Related U.S. Application Data

(63) Continuation of application No. PCT/KR2020/010429, filed on Aug. 6, 2020.

(30) Foreign Application Priority Data

Aug. 9, 2019    (KR) .................. 10-2019-0097354

(51) Int. Cl.
*G01T 1/20*    (2006.01)

(52) U.S. Cl.
CPC ..................... *G01T 1/20* (2013.01)

(58) Field of Classification Search
CPC ....... G01T 1/20; G01T 1/1642; G01T 1/2002; H01J 31/26
See application file for complete search history.

(56) References Cited

U.S. PATENT DOCUMENTS

| | | | | |
|---|---|---|---|---|
| 2,769,915 | A | * | 11/1956 | Tittle .................. G01T 3/06 109/1 S |
| 4,564,753 | A | * | 1/1986 | van Aller ............. G01T 1/22 250/207 |
| 2010/0010343 | A1 | * | 1/2010 | Daghighian ......... A61B 6/4233 250/370.11 |
| 2010/0176301 | A1 | * | 7/2010 | Wieczorek ............ G01T 1/1642 250/366 |
| 2011/0095178 | A1 | * | 4/2011 | Giannakopulos ..... H01J 49/025 250/281 |

FOREIGN PATENT DOCUMENTS

| | | |
|---|---|---|
| JP | H06168692 A | 6/1994 |
| JP | H10199457 A | 7/1998 |
| JP | 2002323568 A | 11/2002 |

(Continued)

OTHER PUBLICATIONS

Korean Search Report and Written Opinion for Application No. PCT/KR2020/010429 dated Oct. 30, 2020.

*Primary Examiner* — Kiho Kim
(74) *Attorney, Agent, or Firm* — KDW Firm PLLC (57) ABSTRACT

A photosensor includes a vacuum tube having an inner space in which a photoelectron moves, a photocathode unit positioned at an upper portion of the vacuum tube to convert incident light incident from an outside into a photoelectron, a scintillator unit to react with the photoelectron to generate scintillation light, and a photomultiplier to convert the scintillation light into a photoelectron, and multiply the converted photoelectron to generate an electrical signal.

15 Claims, 6 Drawing Sheets

(56) References Cited

FOREIGN PATENT DOCUMENTS

| | | |
|---|---|---|
| JP | 2005203280 A | 7/2005 |
| JP | 2015084340 A | 4/2015 |
| KR | 10-20140055026 A | 9/2014 |
| KR | 10-20170078296 A | 7/2017 |
| KR | 10-1824629 B | 1/2018 |
| KR | 10-1864716 B1 | 6/2018 |
| KR | 10-2103577 B1 | 4/2020 |
| WO | WO 2021/029614 A1 | 2/2021 |

* cited by examiner

| Photo-detector | Sensitivity (Photon) | Gain | Bombardment Gain | Photon Gain | Total Gain | Voltage | Type | Comment |
|---|---|---|---|---|---|---|---|---|
| PMT | 1 | ~10⁶ | | | ~10⁶ | ~2 kV | Vacuum Tube | Complicated structure |
| PD | ~100 | 1 | | | 1 | ~50 V | Semiconductor | |
| APD | ~10 | ~100 | | | ~100 | ~200 V | Semiconductor | |
| SiPM | 1 | ~10⁶ | | | ~10⁶ | ~50 V | Semiconductor | |
| HPD | 1 | 1 | ~10⁴ | | ~10⁴ | ~10 kV (~50 V) | Vacuum Tube + Semiconductor | ~10 kV |
| HAPD | 1 | ~100 | ~10⁴ | | ~10⁶ | ~10 kV (~200 V) | Vacuum Tube + Semiconductor | ~10 kV |
| SiPMT | 1 | ~10⁶ | | 20~30 | (2~3) × 10⁷ | ~several kV (~50 V) | Vacuum Tube + Scintillator + Semiconductor | 5 kV |
| HPMT | 1 | ~10⁶ | | 20~30 | (2~3) × 10⁷ | ~several kV (~2 kV) | Vacuum Tube + Scintillator + Vacuum Tube | 5 kV |

PHOTOSENSOR

CROSS-REFERENCE TO RELATED APPLICATIONS

This application is a continuation application from and claims priority to International Patent Application No. PCT/KR2020/010429, filed on Aug. 6, 2020, which claims priority to Korean patent application No. 10-2019-0097354 filed on Aug. 9, 2019, the disclosures of both of which are incorporated by reference herein in their entireties.

TECHNICAL FIELD

The present disclosure relates to a photosensor, and more particularly to a photosensor including a photomultiplier.

BACKGROUND

Most ultra-sensitive photosensors, which are employed in an ultra-precision light measurement field, a radiation measurement field, and a medical examination field, are provided in the forms of photomultiplier tubes (PMT). The PMT includes a plurality of dynodes to multiple secondary electrons, and an anode to finally output an optical signal, to convert light incident to a photomultiplier into an electrical signal. However, the photomultiplier increasingly requires the manufacturing costs due to the complex structure thereof, and the uncertainty about the multiplication rate of the secondary electrons multiplied by the dynode is increased to lower noise performance.

SUMMARY

The present disclosure is to provide a photosensor having an increased multiplication rate and improved noise performance.

The objects of the present disclosure are not limited to the above, but other effects, which are not mentioned, will be apparently understood to those skilled in the art. Other problems which are not mentioned will be clearly understood from the following description to those skilled in the art.

According to an embodiment of the present disclosure, a photosensor includes a vacuum tube having an inner space in which a photoelectron moves, a photocathode unit provided on an inner surface of the vacuum tube to convert incident light incident from an outside into a first photoelectron, a scintillator unit to react with the first photoelectron to generate scintillation light, and a photomultiplier to convert the scintillation light into a second photoelectron, and multiply the converted second photoelectron to generate an electrical signal. The photocathode unit, the scintillator unit, and the photomultiplier are sequentially disposed on a traveling path of the incident light.

In some embodiments, the scintillation unit may include a metal thin film to block a portion, which is directed to the photocathode unit, of the scintillation light.

In some embodiments, the scintillation unit may include a scintillator plate on a top surface of the photomultiplier.

In some embodiments, the scintillator plate may have a thickness of about 1 mm to 2 mm and may include any one of an inorganic crystalline scintillator, an organic crystalline scintillator, and a plastic scintillator.

In some embodiments, the scintillator unit may include a substrate on a top surface of the photomultiplier and a scintillator layer formed on a top surface of the substrate.

In some embodiments, the scintillator layer may include an organic scintillator or a plastic scintillator.

In some embodiments, the substrate may have the thickness of 1 mm to 2 mm, and the scintillator layer may have the thickness of 20 μm.

In some embodiments, the photosensor may further include an electrode provided on the inner surface of the vacuum tube to focus the first photoelectron to the scintillator unit.

In some embodiments, a voltage of 3 kV to 30 kV may be applied to the electrode.

In some embodiments, the vacuum tube has an upper area in a spherical shape, and a lower area in a cylindrical shape. The photocathode unit and the electrode may be positioned at the upper area of the vacuum tube, and the scintillator unit and the photomultiplier may be positioned at the lower area of the vacuum tube.

In some embodiments, the diameter of the upper area of the vacuum tube may be provided to be greater than the diameter of the lower area of the vacuum tube.

In some embodiments, the area of the one surface, which is opposite to the scintillator, of the photocathode unit may be provided to be wider than the area of one surface, which is opposite to the photocathode unit, of the scintillator.

In some embodiments, an entire portion of the scintillator unit may be provided to be overlapped with the photocathode unit, when viewed above from the photocathode unit.

In some embodiments, the photomultiplier may be a silicon photomultiplier.

According to another aspect of the present disclosure, a photo sensor includes a vacuum tube, a photocathode unit and a photomultiplier provided on an inner surface of the vacuum tube to be opposite to each other, and a scintillator unit provided on the inner surface of the vacuum tube, between the photocathode unit and the photomultiplier, and opposite to the photocathode unit.

As described above, according to various embodiments of the present disclosure, the photosensor having the increased multiplication rate and the improved noise performance may be provided.

The effects of the present disclosure are not limited to the above effects. Any other effects not mentioned herein will be clearly understood from the following description by those skilled in the art to which the present disclosure pertains.

DETAILED DESCRIPTION

According to an embodiment of the present disclosure, other advantages and features and methods of accomplishing the same may be understood more readily with reference to the following detailed description of an embodiment and the accompanying drawings. However, the present disclosure may be embodied in various different forms and should not be construed as being limited only to the illustrated embodiments. Rather, these embodiments are provided as examples so that this disclosure will be thorough and complete, and will fully convey the concept of the present disclosure to those skilled in the art. The present disclosure may be defined by scope of the claims.

Unless otherwise specified, all terms used herein, including technical or scientific terms, have the same meanings as those generally understood by those skilled in the art to which the present disclosure pertains. It will be further understood that terms used herein should be interpreted as having a meaning that is consistent with their meaning in the context of this disclosure and the relevant art and will not be interpreted in an idealized or overly formal sense unless expressly so defined in the present disclosure.

The terms used in the present disclosure are provided for the illustrative purpose, but the present disclosure is not limited thereto. As used herein, the singular terms are intended to include the plural forms as well, unless the context clearly indicates otherwise. Furthermore, it will be further understood that the terms "comprises", and/or various modifications, such as "comprising," "includes" and/or "including", when used herein, specify the presence of stated compositions, ingredients, components, steps, operations, and/or elements, but do not preclude the presence or addition of one or more other compositions, ingredients, components, steps, operations, and/or elements. In the present disclosure, the term "and/or" indicates each of associated listed items and include various possible combinations of one or more of the associated listed items.

In the present specification, when a certain component (a first component) is provided, formed, or positioned "on" another component (a second component), the first component may make contact with an upper portion of the second component, and may be provided, formed, or positioned spaced apart from the second component.

The present disclosure relates to a silicon photomultiplier (SiPMT) including a silicon photomultiplier instead of a dynode and an anode. The present disclosure uses the silicon photomultiplier to multiple and covert a photoelectron converted by a photocathode to an electrical signal. In exemplary embodiments, the scintillator may be disposed between the SiPMT and the photocathode, thereby increasing the photomultiplication rate and improving the noise performance, which is different from a conventional technology in which a photomultiplier multiples a photoelectron by using the dynode and the anode. Hereinafter, a photosensor will be described in detail with reference to accompanying drawings, according to various embodiments of the present disclosure.

Figure 1:
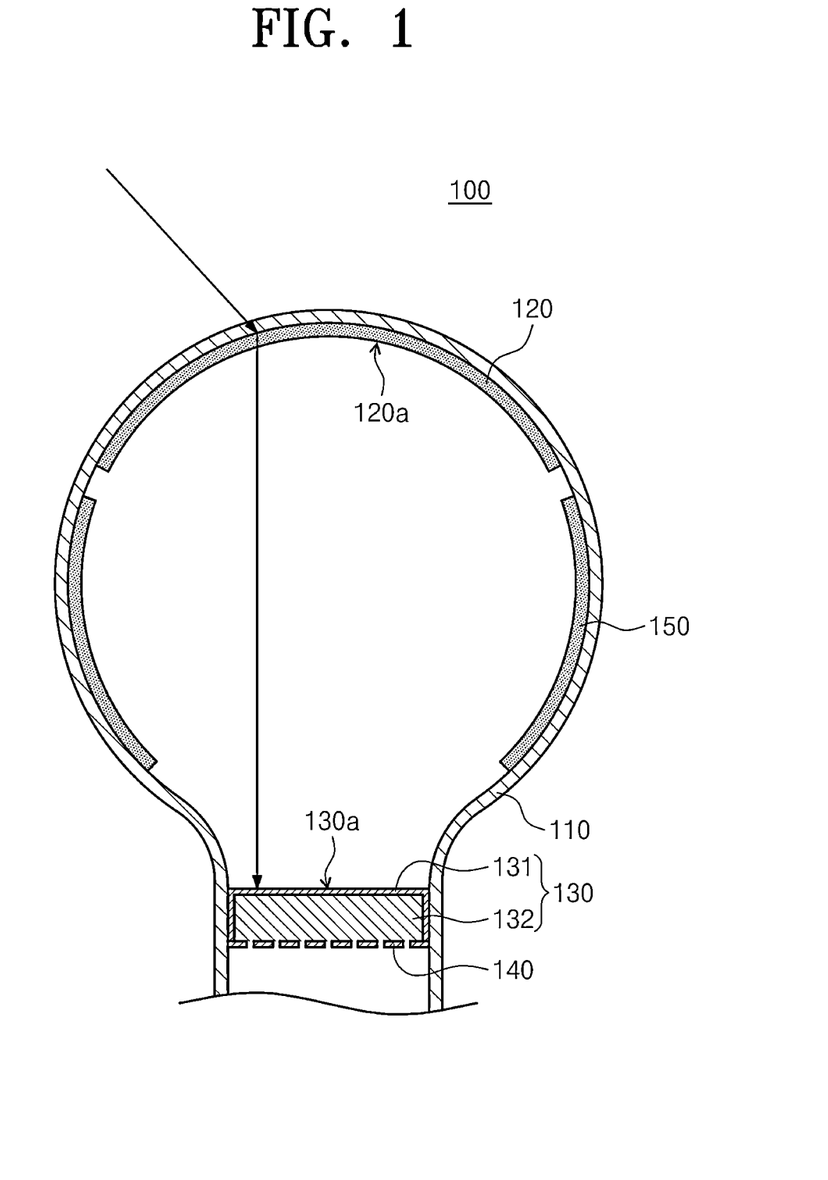
FIGS. 1 and 2 are cross-sectional views illustrating a photosensor, according to an embodiment of the present disclosure.

FIG. 1 is a cross-sectional view illustrating a photosensor, according to an embodiment of the present disclosure.

Referring to FIG. 1, a photosensor 100 includes a vacuum tube 110, a photocathode unit 120, a scintillator unit 130, a photomultiplier 140, and an electrode 150. The vacuum tube 110 provides an inner space in which photoelectrons move. The vacuum tube 110 may be a vacuum tube. The photocathode unit 120 may be provided on the inner surface of the vacuum tube 110. The vacuum tube 110 may have a spherical upper area (a side to which light is incident) and a cylindrical lower area (a side opposite to the side to the light is incident). In this case, the photocathode unit 120 and the electrode 150 may be positioned at the upper area of the vacuum tube 110, and the scintillator unit 130 and the photomultiplier 140 may be positioned at the lower area of the vacuum tube 110. For example, the photocathode unit 120 and the electrode 150 are provided to be spaced apart from each other in a vertical direction along the inner surface of the spherical part constituting the upper area of the vacuum tube 110, and the scintillator unit 130 and the photomultiplier 140 may be provided in the vertical direction along the inner surface of the cylindrical part constituting the lower area of the vacuum tube 110. However, the present disclosure is not limited thereto. The photocathode unit 120, the scintillator unit 130, the photomultiplier 140, and the electrode 150 may be provided at proper positions depending on the type of the photosensor 100.

The photosensor unit 120 converts the light, which is incident from the outside, into a first photoelectron. In detail, the photocathode unit 120 may include a photocathode, and the photocathode may convert an incident photon, which is included in the incident light, to a photoelectron.

The photocathode unit 120 may be provided at the upper portion of the vacuum tube 110 such that the photocathode unit 120 is wider than the scintillator unit 130. In this case, the photocathode unit 120 may be provided on the inner surface of the upper portion of the vacuum tube 110 such that all areas of the scintillator unit 130 are overlapped with the photocathode unit 120, when viewed from above the photocathode unit 120 (for example, when viewed from the side to which light is incident). For example, when viewed from above the vacuum tube 110 (when viewed from the side to which the light is incident), the photocathode unit 120 and the scintillator unit 130 may be provided such that the scintillator unit 130 is fully covered by the photocathode unit 120. For example, one surface 120a (a surface facing the inner space of the vacuum tube 110) of the photocathode unit 120 may be opposite to one surface 130a (a surface facing the inner space of the vacuum tube 110) of the scintillator unit 130, and the area of the one surface 120a of the photocathode unit 120 may be wider than the area of the one surface 130a of the scintillator unit 130. According to an embodiment, when viewed from above the vacuum tube 120 (when viewed from the side to which the light is incident), the one surface 120a of the photocathode unit 120 fully covers the one surface 130a of the scintillator unit 130.

The electrode 150 is provided on the inner surface of the vacuum tube 110 to be spaced apart from the photocathode unit 120. For example, the photocathode unit 120 is provided on the inner surface of the upper portion of the vacuum tube 110, and the electrode 150 is spaced apart from the photocathode unit 120 and provided at a side portion of the inner surface of the vacuum tube 110. The electrode 150 may accelerate the photoelectron obtained through the conversion by the photocathode unit 120 and may focus the photoelectron on the scintillator unit 130. A power supply unit may be connected to the electrode 150. A voltage ranging from about 3 kV to about 30 kV may be applied to the electrode 150. When the voltage applied to the electrode 150 is about 30 kV, the scintillator unit 130 have a thickness of about 10 μm for an inorganic crystalline scintillator, 20 μm for an organic scintillator and a plastic scintillator. In such cases, all photoelectrons having the energy of 30 keV may be converted to scintillation light.

The scintillator unit 130 may include a scintillator plate 132 on (in contact with) a top surface of the photomultiplier 140, and a metal thin film 131 on the scintillator plate 132. The metal thin film 131 may block scintillation light directed to the photocathode unit 120. The metal thin film 131 may be formed on a top surface and a side surface of the scintillator unit 130. The scintillator plate 132 may be any one of an inorganic crystalline scintillator, an organic crystalline scintillator, or a plastic scintillator provided in the form of a plate. The scintillator plate 132 may have the thickness from 1 mm to 2 mm. The scintillator unit 130 reacts with the photoelectron to generate the scintillation light. In this case, photons may be multiplied in the scintillator unit 130. For example, when the voltage of 5 kV is applied to the electrode 150, photons may be multiplied to approximately 10 to 30 times. Accordingly, an additional gain 10 times greater than the gain of a photosensor including only a photomultiplier may be obtained. The metal thin film 131 blocks a portion, which is directed to the photocathode unit 120, of the scintillation light. The scintillation light generated from the scintillator unit 130 is isotropically generated, and photoelectrons are generated when the scintillation light reaches the photocathode unit 120. The photoelectrons may make an after-glow signal through an acceleration process and a process of generating scintillation light. The after-glow signal may become noise for the initial signal of the incident light and may degrade the performance of the photosensor 100 Accordingly, the metal thin film 131 is formed on the top surface and the side surface of the scintillator unit 130 to block (absorb or reflect) the scintillation light directed to the photocathode unit 120, thereby preventing the performance of the photosensor 100 from being degraded. The metal thin film 131 may include aluminum (Al). In addition, the metal thin film 131 may have the thickness of about 100 nm. However, the present disclosure is not limited thereto. For example, the metal thin film 131 may include various metal materials to block the scintillation light, and may have various thicknesses. According to an embodiment, the metal thin film 131 may not be provided.

The photomultiplier 140 converts the scintillation light, which is generated from the scintillator unit 130, into second photoelectrons, and generates an electrical signal by multiplying the converted second photoelectrons. The photomultiplier 140 may be a silicon photomultiplier (SiPm). The photomultiplier 140 is a device having micropixels which operate in a geiger mode and are connected to each other in parallel to each other through a quenching resistor. Since the micropixels operate in the geiger mode, even if several photons are simultaneously incident to one micropixel, a signal generated is the same with when a single photon is incident. Accordingly, in order to avoid wasting of the scintillation light, the photomultiplier 140 needs to be disposed at a distance such that at most a single photon is incident to the pixel when the scintillation light generated in the scintillator unit 130 reaches the micropixel. To this end, in the case the area of the micropixel is 30 µm×30 µm, the distance between the position, from which the scintillation light is generated, of the scintillation unit 130 and the photomultiplier 140 may be provided to about 1 mm. When the area of the micropixel is 60 µm*60 µm, the distance between the position, from which the scintillation light is generated, of the scintillation unit 130 and the photomultiplier 140 may be provided to about 2 mm. In other words, the distance between a position, from which the scintillation light is generated from the scintillator unit 130, and the photomultiplier 140 may be provided to be in the range of about 1 mm to 2 mm. To ensure the distance between the position, from which the scintillation light is generated, and the photomultiplier 140, the thickness of the scintillator plate 132 (any one of the inorganic crystalline scintillator, the organic crystalline scintillator, and the organic crystalline scintillator) may be provided to be in the range of about 1 mm to 2 mm.

The photomultiplier 140 may obtain the gain of $10^6$ times or more. Accordingly, when the voltage of 5 kV is applied to the electrode 150, the photosensor may have an about $1 \times 10^7$ to $3 \times 10^7$ times gain. In addition, according to an embodiment of the present disclosure, the photosensor 100 employs the SiPM instead of employing the dynode. Accordingly, the uncertainty of the multiplication rate of the secondary photo electrons may be reduced, and the best signal-to-noise (SNR) may be obtained.

The photocathode unit 120, the scintillator unit 130, and the photomultiplier 140 may be sequentially disposed on the traveling path of the incident light, such that the incident light is sequentially converted into the first photoelectron, the scintillation light, and the second photoelectron. Meanwhile, the electrode 150 may be provided on the traveling path of incident light between the photocathode unit 120 and the scintillator unit 130. The scintillator unit 130, in detail, the scintillator plate 132 of the scintillator unit 130 may be provided to be spaced apart from the photomultiplier 140.

Figure 2:
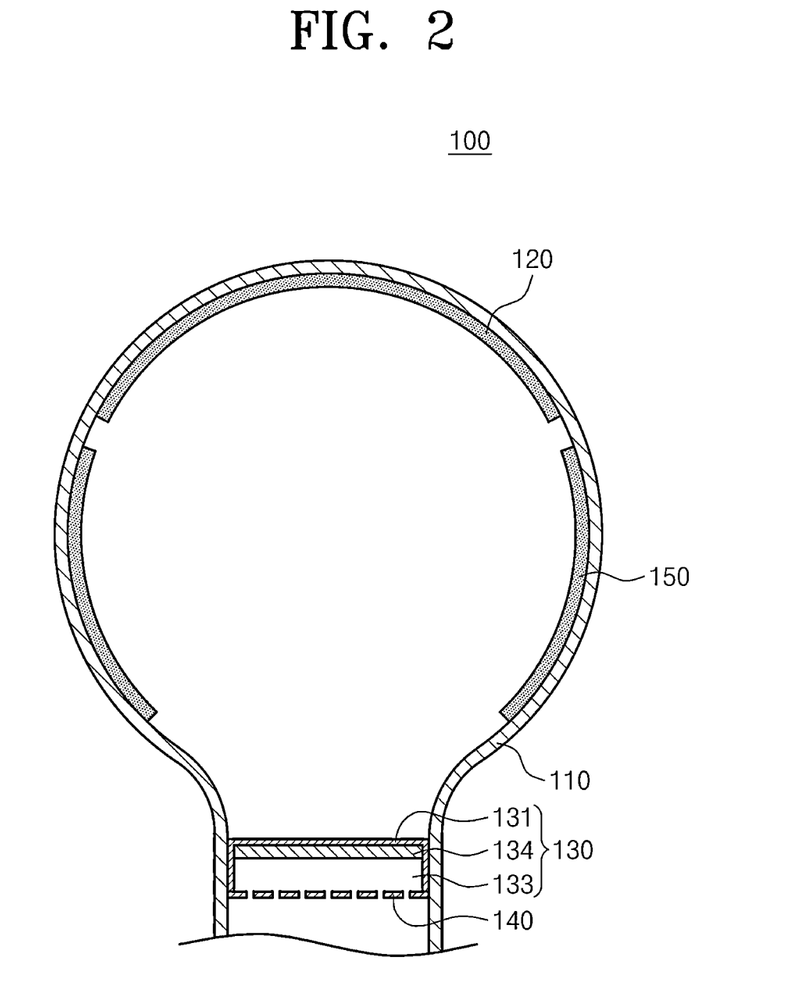

FIG. 2 is a cross-sectional view illustrating a photosensor, according to another embodiment of the present disclosure. An embodiment in FIG. 2 differs from an embodiment in FIG. 1 in the configuration of the scintillator unit 130.

Referring to FIG. 2, the scintillator unit 130 may include a substrate 133 and a scintillator layer 134. The substrate 133 may be positioned while making contact with a top surface of the photomultiplier 140. The substrate 133 may include a glass material. The substrate 133 may be provided to have the thickness of 1 mm to 2 mm, to ensure the distance between the position at which the scintillation light is generated, and the photomultiplier 140. The scintillation layer 134 may be formed on the substrate 133. Accordingly, the scintillation layer 134 of the scintillator unit 130 may be spaced apart from the photomultiplier 140 by the substrate 133. The semiconductor layer 105 may include an organic scintillator or a plastic scintillator. Although the scintillation layer 134 may have the thickness of 20 µm, the present disclosure is not limited thereto. The scintillator unit 130, in detail, the substrate 133 of the scintillator unit 130 is provided on the photomultiplier 140 while making contact with the photomultiplier 140 However, the substrate 133 of the scintillator unit 130 may be provided to be spaced apart from the photomultiplier 140.

Figure 3:
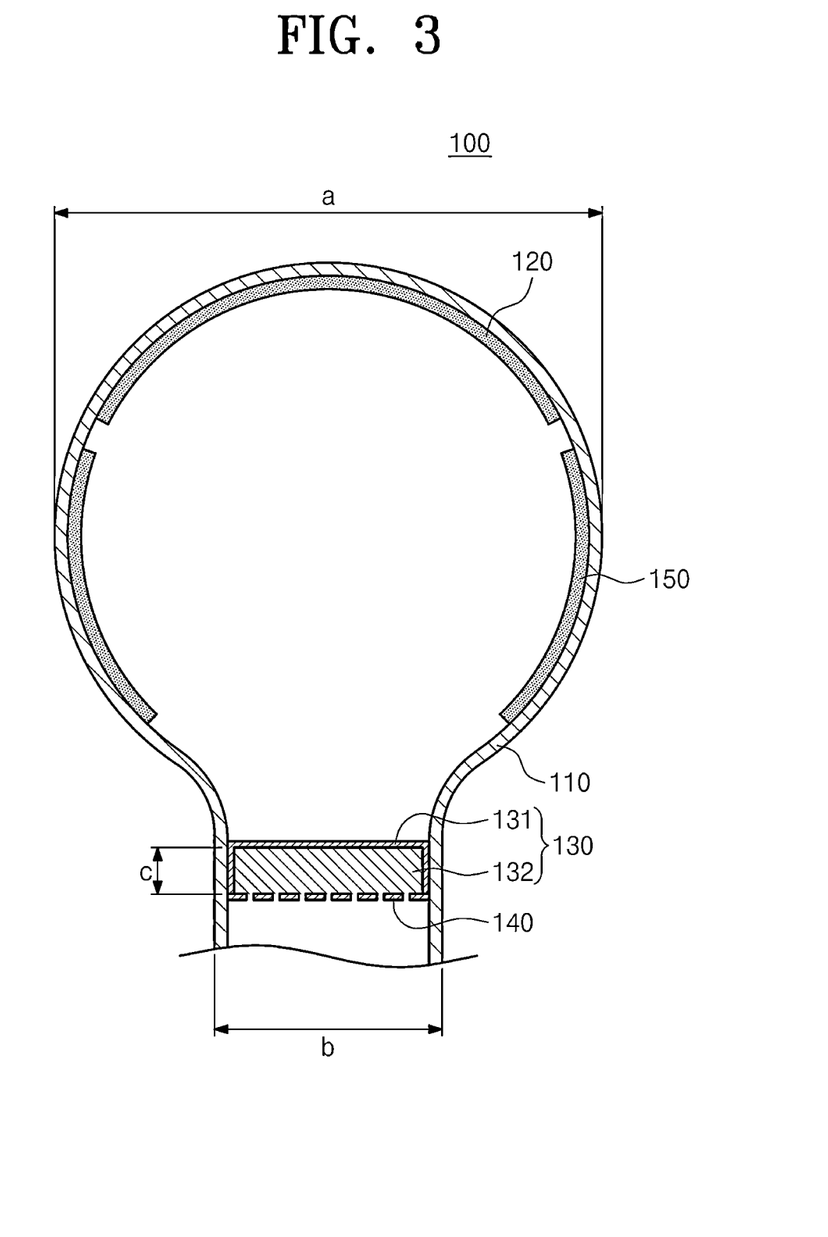
FIGS. 3 and 4 are views illustrating the detailed structure of a photosensor, according to an embodiment of the present disclosure.
Figure 4:
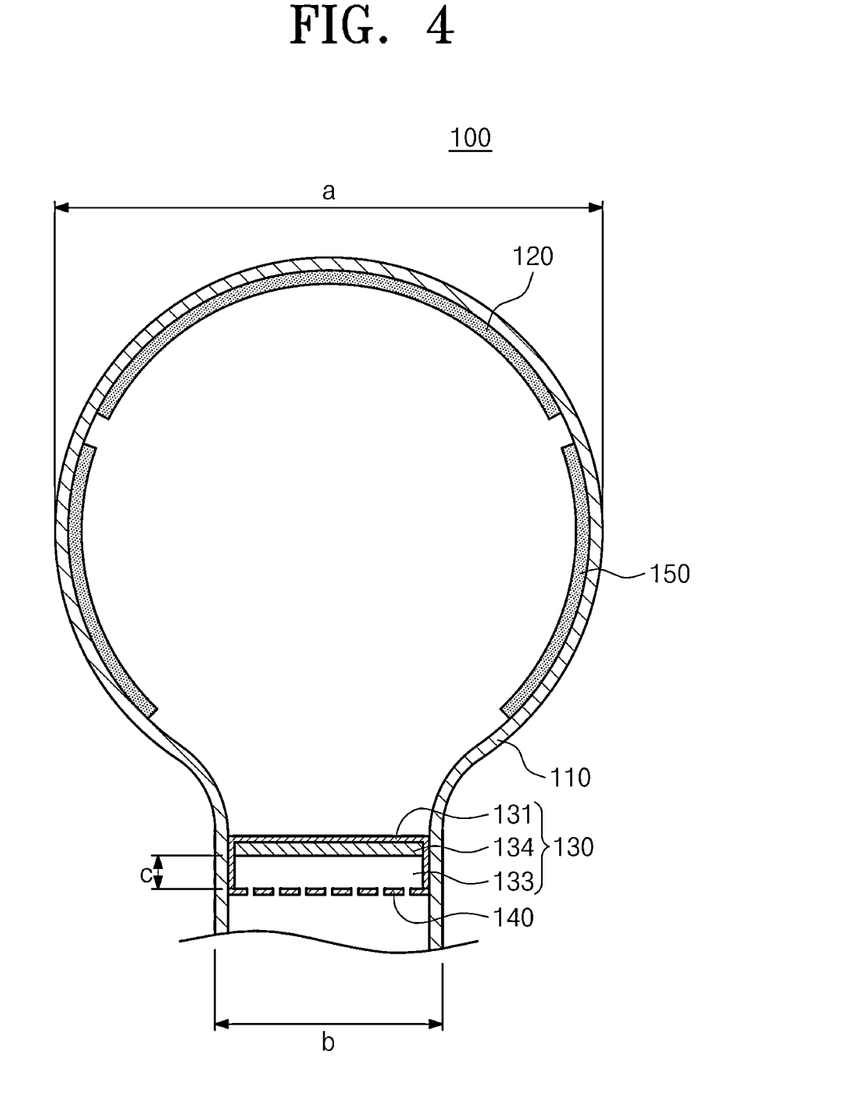

Referring to FIGS. 3 and 4, the vacuum tube 110 may have a spherical upper area and a cylindrical lower area. The diameter 'a' (for example, the width of the upper area) of the upper area may be provided to be greater than the diameter 'b' (for example, the width of the lower area) of the lower area. For example, the diameter 'a' of the upper area may be provided to be in the range of 5 cm to 50 cm. The scintillator unit 130 may include the scintillator plate 132 having the thickness 'c' of 1 mm to 2 mm as illustrated in FIG. 3, or may include the substrate 133 having the thickness 'c' of 1 mm to 2 mm and the scintillator layer 134 formed on the substrate 133 as illustrated in FIG. 4. In this case, the metal thin film 131 may be provided on the scintillator plate 132 as illustrated in FIG. 3 and/or on the substrate 133 and the scintillator layer 134 as illustrated in FIG. 4. The scintillator layer 134 in FIG. 4 may have the thickness of 20 µm, but the present disclosure is not limited thereto. The scintillator plate 132 of FIG. 3 may any one of an inorganic crystalline scintillator, an organic crystalline scintillator, and a plastic scintillator. The scintillator layer 134 formed on the top surface of the substrate 133 may include an organic scintillator or a plastic scintillator.

Figure 5:
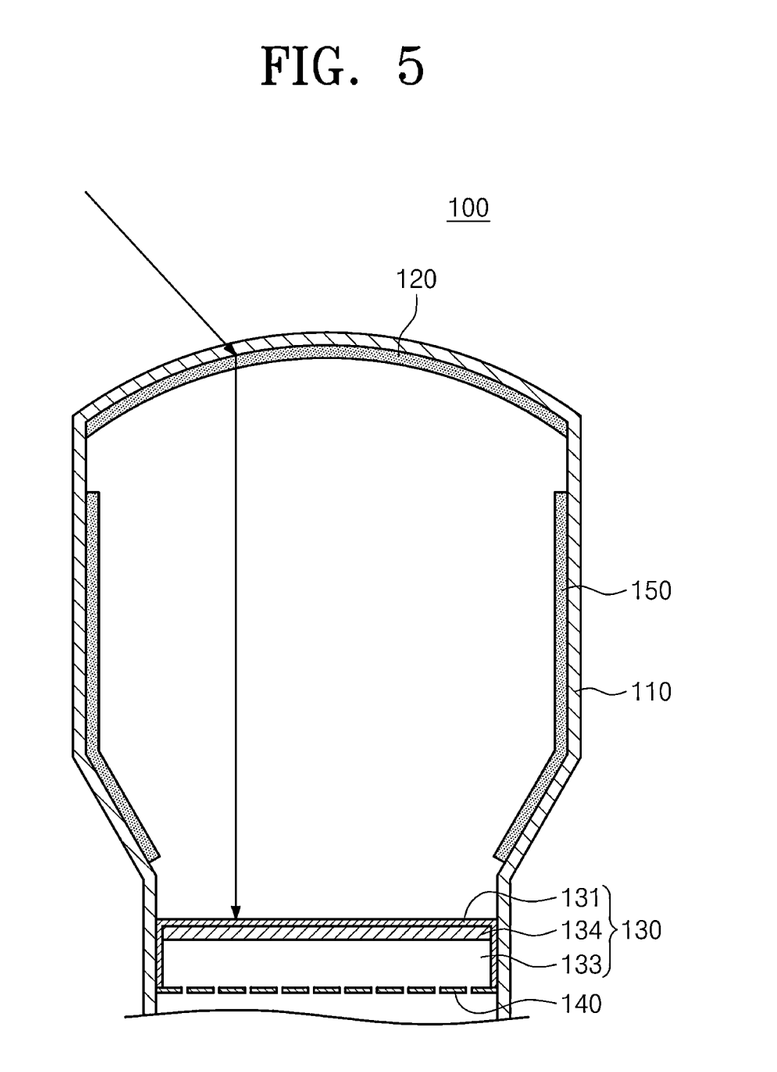
FIG. 5 is a cross-sectional view illustrating a photosensor, according to another embodiment of the present disclosure.
Figure 6:
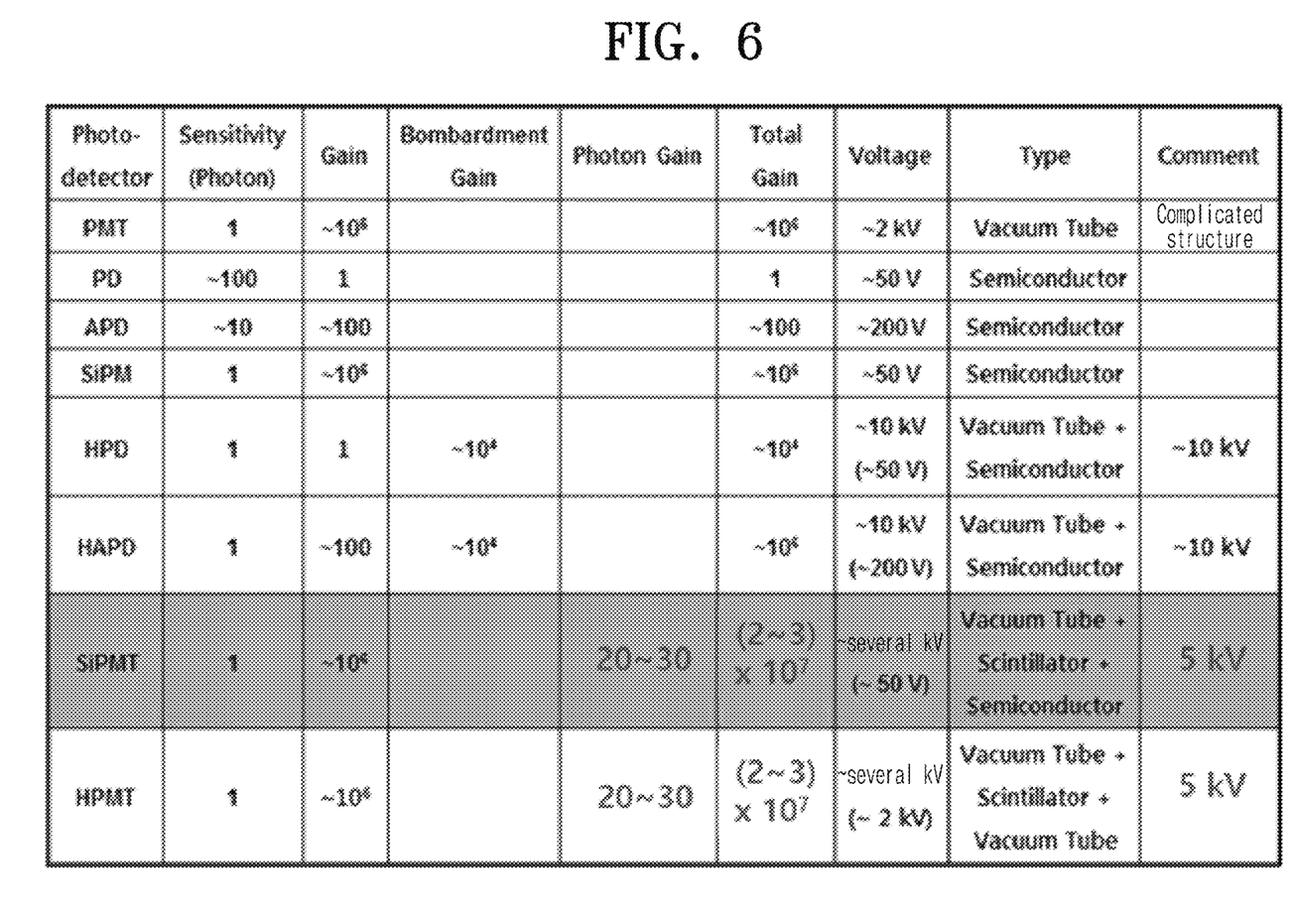
FIG. 6 is a view illustrating the comparison with another photosensor in terms of a numeric value of the photosensor, according to an embodiment of the present disclosure.

The photocathode unit 120 and the electrode 150 may be provided at the upper area of the vacuum tube 110, and the scintillator unit 130 and the photomultiplier 140 may be provided at the lower area of the vacuum tube 110. In addition, the upper area and the lower area of the vacuum tube 110 are not limited to be in the spherical shape and the cylindrical shape, but may have various shapes sufficient for a photon to move. For example, as illustrated in FIG. 5, the upper area of the vacuum tube 110 may be provided in the combination of a convex shape, a cylindrical shape, and a truncated cone shape. In this case, the photocathode unit 120 may be provided on an inner surface of the convex-shape part (upper part of the vacuum tube 110) and the electrode 150 may be provided in the cylindrical shape part and the truncated cone shape part (side part of the vacuum tube 110). Alternatively, the electrode 150 may be provided in the cylindrical-shape part of the vacuum tube 110, and not provided in the truncated cone shape part of the vacuum tube 110. The photoelectron may move to the scintillator unit 130 by the photocathode unit 120 and the electrode 150, and may be converted into the scintillator light to the scintillator unit 130. The scintillation light may be amplified by the silicon photomultiplier (SiPM) 140 and may be converted to the electrical signal. Therefore, according to the present disclosure, the photosensor 100 may convert incident light to an electrical signal having a higher gain, thereby exactly sensing light in an ultra-precision field, and improving the SNR by using a SiPM. Referring to FIG. 6, according to an embodiment of the present disclosure, it may be recognized that the photosensor including the SiPM (a gray-shaded area in the table of FIG. 6) provides the total gain of $2 \times 10^7 \sim 3 \times 10^7$, which is higher than gains of other optical sensors.

As described above, according to various embodiments of the present disclosure, the photosensor having the increased multiplication rate and the improved noise performance may be provided.

While the present disclosure has been described with reference to exemplary embodiments, it will be apparent to those skilled in the art that various changes and modifications may be made without departing from the spirit and scope of the present disclosure. Therefore, it should be understood that the above embodiments are not limiting, but illustrative. For example, according to an embodiment of the present disclosure, components may be distributed and reproduced. To the contrary, several distributed components may be combined and reproduced. Accordingly, the technical scope of the present disclosure is not limited to the detailed description of this specification, but should be defined by the claims. It should be understood that the technical protection scope of the present disclosure is not limited to the literary description of the claims itself, but actually the technical value extends even to the present disclosure of the equal scope.

DESCRIPTION OF REFERENCE NUMERALS 100 photosensor
110 vacuum tube
120 photocathode unit
130 scintillator unit
131 metal thin film
132 scintillator plate
133 substrate
134 scintillator layer
140 photomultiplier
150 electrode

The invention claimed is:

1. A photosensor comprising:
    a vacuum tube comprising:
        an upper area;
        a lower area that is connected to and extends away from the upper area, such that the lower area is outside of the upper area; and
        an inner space that is defined in the upper area and the lower area together and extends between the upper area and the lower area;
    a photocathode that is in the upper area of the vacuum tube and attached to an inner surface of the upper area of the vacuum tube, wherein the photocathode is configured to convert incident light from outside of the vacuum tube into a first photoelectron;
    a scintillator that is in the lower area of the vacuum tube and attached to an inner surface of the lower area of the vacuum tube, wherein the scintillator is configured to react with the first photoelectron to generate scintillation light; and
    a photomultiplier that is in the lower area of the vacuum tube and attached to the inner surface of the lower area of the vacuum tube, wherein the photomultiplier is configured to:
        convert the scintillation light into a second photoelectron; and
        multiply the second photoelectron to generate an electrical signal;
    wherein the photocathode, the scintillator, and the photomultiplier are sequentially disposed on a traveling path of the incident light.

2. The photosensor of claim 1, wherein the scintillator includes a metal thin film to block a portion, which is directed to the photocathode, of the scintillation light.

3. The photosensor of claim 1, wherein the scintillator includes a scintillator plate on a top surface of the photomultiplier.

4. The photosensor of claim 3, wherein the scintillator plate has a thickness of about 1 mm to about 2 mm and includes one of an inorganic crystalline scintillator, an organic crystalline scintillator, or a plastic scintillator.

5. The photosensor of claim 1, wherein the scintillator includes:
    a substrate on a top surface of the photomultiplier; and
    a scintillator layer on a top surface of the substrate.

6. The photosensor of claim 5, wherein the scintillator layer includes an organic scintillator or a plastic scintillator.

7. The photosensor of claim 5,
    wherein the substrate has a thickness of about 1 mm to about 2 mm, and
    wherein the scintillator layer has a thickness of about 20 μm.

8. The photosensor of claim 1, comprising an electrode interposed between the photocathode and the scintillator, within the vacuum tube, wherein the electrode is configured to focus the first photoelectron to the scintillator unit.

9. The photosensor of claim 8, wherein a voltage of 3 kV to 30 kV is applied to the electrode.

10. The photosensor of claim 8, wherein:
    the upper area has a spherical shape;
    the lower area has a cylindrical shape; and
    the electrode is in the upper area of the vacuum tube.

11. The photosensor of claim 10, wherein the upper area of the vacuum tube has a diameter that is greater than a diameter of the lower area of the vacuum tube.

12. The photosensor of claim 11, wherein a first surface of the photocathode, which is opposite from the scintillator, is wider than a second surface of the scintillator, which is opposite from the photocathode.

13. The photosensor of claim 12, wherein an entire portion of the scintillator is configured to be overlapped with the photocathode when viewed above from the photocathode.

14. The photosensor of claim 1, wherein the photomultiplier is a silicon photomultiplier.

15. A photosensor comprising:
- a vacuum tube comprising:
  - an upper area;
  - a lower area that is connected to and extends away from the upper area, such that the lower area is outside of the upper area; and
  - an inner space that is defined in the upper area and the lower area together and extends between the upper area and the lower area;
- a photocathode that is in the upper area of the vacuum tube and attached to an inner surface of the upper area of the vacuum tube;
- a photomultiplier that is in the lower area of the vacuum tube and attached to an inner surface of the lower area of the vacuum tube, such that the photomultiplier and the photocathode are opposite each other in the vacuum tube; and
- a scintillator that is in the lower area of the vacuum tube and attached to the inner surface of the lower area of the vacuum tube, such that the scintillator is between the photocathode and the photomultiplier, with the scintillator being on an opposite side of the vacuum tube from the photocathode.

* * * * *